United States Patent Office 3,264,089
Patented August 2, 1966

3,264,089
SLOW RELEASE FERTILIZER GRANULE HAVING A PLURALITY OF URETHANE RESIN COATINGS
Louis I. Hansen, Minneapolis, Minn., assignor to Archer-Daniels-Midland Company, Minneapolis, Minn., a corporation of Delaware
No Drawing. Filed Dec. 10, 1965, Ser. No. 513,071
8 Claims. (Cl. 71—64)

This is a continuation-in-part of Serial No. 132,383, filed August 18, 1961, now U.S. Patent 3,223,518.

The present invention relates to coated fertilizers and to the preparation thereof. In one aspect, the present invention relates to fertilizer products comprising a core of fertilizer (e.g., in granular, pelletized or prilled form) which is surrounded by a plurality of water insoluble coatings. These coatings delay and effect a slow and gradual release of the water soluble plant nutrients contained in the fertilizer. These coatings also facilitate handling and storage of the fertilizer. Typically, these coatings each amount to from about 0.1 to 5% by weight based on the weight of the core.

Aside from the dusting and caking problems frequently associated with the use of ordinary fertilizers, one of their major disadvantages is that they are leached too rapidly into the soil. This rapid leaching causes plants to be burned. As a result, care must be taken to avoid excessively heavy applications of fertilizer (to thereby prevent burning). To do this frequently necessitates several applications of fertilizer throughout a growing cycle. Further, the rapid leach rate of ordinary fertilizers has also been known to cause plants to grow in spurts. Thus, an abnormally high growth rate frequently follows a fertilizer application. This growth rate diminishes rapidly as the fertilizer is depleted. Throughout successive applications of fertilizer, this cycle of high growth rate followed by a rapid diminishing of the growth rate is apparent. Further, the high leach rate associated with common fertilizers also causes water soluble plant nutrients to be lost since they are made available to plants faster than the plants can utilize them.

Consequently, it is desirable that fertilizer products be provided which offer a metered or gradual release of the water soluble fertilizer components to thereby provide a uniform rate of growth. Such a slow release fertilizer would also offer the advantage that larger amounts of fertilizer could be included in any given application. Thus, the necessity for subsequent applications could be substantially reduced or even eliminated entirely. Moreover, the losses of fertilizer associated with high leach rates could be avoided.

Various attempts have been made to develop anti-caking fertilizers, dust-free fertilizers, and to a lesser extent, slow-release fertilizers. For example, the use of materials such as stearic acid and diatomaceous earth have been reported as assisting the free-flowing and non-caking qualities of fertilizer granules without providing a metered release of the soluble components of the fertilizer.

I have discovered, and this discovery forms a basis for the present invention, that an effective slow-release fertilizer can be prepared by encapsulating or coating fertilizer with urethane coating compositions of the type known to the coatings industry. Urethane varnishes, when applied in film-form on fertilizer granules and then cured, provide a water-insoluble coating around the fertilizer and perform a metering function which delays and effects the slow and gradual release of water-soluble components contained in the fertilizer. This slow rate of release can be controlled to provide a substantially uniform rate of release over extended periods of time. Typically, a high analysis fertilizer (e.g., 10–10–10) is encapsulated with a plurality of these coatings to provide a dry, free-flowable, granular, slow-release fertilizer which minimizes leaching losses, prevents plant overfeeding, and the like. During use, the coating or shell which surrounds the core of fertilizer has been noted to remain intact.

The present invention is applicable to both organic and inorganic fertilizers which contain water soluble plant nutrients. Such fertilizers contain plant nutrients, frequently in the form of water-soluble salts of such elements as carbon, nitrogen, oxygen, phosphorus, sulfur, potassium, calcium, magnesium, manganese, zinc, copper, boron, chlorine, and the like as well as other trace elements (reference is made to the Yearbook of Agriculture, U.S.D.A. 1957, page 81). Especially well adapted to the present invention are the commercially produced inorganic fertilizers containing nitrogen, phosphorus and/or potassium. These are generally prepared as heterogeneous granules, prills, and the like. For purposes of this invention, granules, prills, etc., are considered as equivalents. The present invention is also applicable to such single component fertilizers as ammonium nitrate, urea, potassium chloride, and the like. Common fertilizers designated as 8–24–12, 8–8–6, 5–20–20, 12–12–12, 14–16–0, 4–8–6, 3–9–6, 39–0–0, 9–39–0, 10–10–10, 20–10–5, 0–46–0, and the like, are well suited for use in the present invention. All of these fertilizers may optionally contain supplementary additives such as trace elements, iron salts, insecticides, herbicides, fungicides, and the like. Further, the plant nutrients may be impregnated on or admixed with inert materials, e.g., silica, coke, and the like.

The coating or film-forming materials used to encapsulate fertilizer according to the present invention, are urethane coating compositions of the type known to the coatings industry. These resins are commonly produced by the reaction of isocyanates (e.g., toluene diisocyanate or a toluene diisocyanate/polyol adduct) with hydroxyl-containing materials (e.g. polyethylene glycol of 1200 molecular weight) and are known commercially as, for example, Arothane resins (e.g. Arothane 156). These urethane resins are well known and their preparation forms no part of the present invention.

The isocyanates used in preparing these urethane coatings can be cyclic or acylic isocyanates. While diisocyanates are commonly employed, polyisocyanates and isocyanate pre-polymers can also be used. Suitable but non-limiting examples of the isocyanates are: 1,6-hexamethylene diisocyanate; toluene diisocyanate; methylene bis(4-phenyl isocyanate); tri-phenyl methane triisocyanate; chloro-phenylene-2,4-diisocyanate; polymers containing terminal NCO groups; etc. Polymers containing terminal NCO groups are usually the reaction product of (1) polyether glycols and an isocyanate, (2) hydroxyl-terminated polyesters and an isocyanate, or (3) polyfunctional alcohols and an isocyanate. A preferred isocyanate is toluene diisocyanate. Mixtures of isocyanates can be used.

Suitable but non-limiting examples of hydroxyl-containing materials for use in preparing urethane coatings for use in this invention are: the polyalkylene glycols such as polyethylene glycol and polypropylene glycol; hydroxyl-terminated polyesters such as the various glycerolysis products; glycols such as ethylene, butylene and diethylene glycols; triols such as glycerol, trimethylol ethane and hexane triol; other polyols such as pentaerythritol; etc. Mixtures of hydroxyl-containing materials can be used.

Preferred urethane coating compositions for use in this invention are those prepared by reacting an aromatic dior polyisocyanate with one or more polyether diols or polyols. Typically, an isocyanate such as toluene diisocyanate is reacted with polyethylene glycol, polypropylene glycol, or a mixture thereof. Polyether diols and polyols having molecular weights of at least 500 are preferred. Particularly preferred are those polyether diols having molecular weights of from 800 to 1500, e.g. 1000–1200. If desired, common polyols such as the $C_2$–$C_{12}$ aliphatic glycols and polyhydric alcohols can also be used in addition to the polyethers. The use of these simple polyols allows film hardness, film flexibility, chemical resistance, etc., of the coating compositions to be altered to meet specific needs. Suitable, but non-limiting examples of the simple polyols include 1,3-butanediol, trimethylol propane, ethylene glycol, pentaerythritol, etc.

Ordinarily, the urethane coating compositions are prepared by heating the reactants together at temperatures of from 165°–215° F. for several hours, generally under an inert atmosphere and under anhydrous conditions. The amount of each reactant employed can vary widely. Usually, the reactants are selected to provide an NCO/OH ratio of from 1.3–2.5:1. More usually, this ratio will be from about 1.4:1 to 2:1. The resulting resins, generally diluted with suitable solvents to, for example, 30–70% non-volatile (N.V.), are then stored in air tight containers until the time of use. At the time of use, the urethane coating composition is applied to the fertilizer granules and cured. Curing can be accelerated by the use of heat and by catalysis. Commonly employed catalysts are dibutyl tin dilaurate, methyl diethanol amine, triethylene diamine, etc.

When coating fertilizer according to the present invention, a urethane coating resin (or a mixture of such resins) and, preferably, a suitable catalyst (or mixture thereof) are mixed. It is desirable to include solvent in this mixture to facilitate its application in film form to the fertilizer granules to be coated. Ordinarily, the urethane resin will be obtained as a solvent solution and additional solvent may not be needed. Rapid drying solvents are required since it is necessary to ultimately remove the solvent from the wet films which have been applied to the fertilizer without heating the fertilizer to a point at which decomposition takes place. The selection of suitable solvents is a task within the skill of the art. The amount of catalyst which is used will vary, depending upon the choice of urethane resin and catalyst. Suitable catalysts are already known to the art and the selection of a suitable catalyst, together with the selection of suitable proportions, are acts within the skill of the art. If desired, the urethane coating composition can additionally contain pigments, dyes, driers, stabilizers, and the like.

When coating fertilizers according to the present invention, I have found that substantial benefits are obtained when a plurality of coatings are employed, as opposed to a single coating. I have found that a single coating, regardless of amount, is generally inferior to a plurality of coatings of the same type, when the same total coating weight is employed. Although each of the coatings (considering only the weight of urethane resin on a 100% solids basis) can range from as little as, for example, 0.1 percent up to 10 percent or more, based on the weight of the core, I have found that individual coating weights of from 0.2 to 4 percent, on the same basis, are particularly well suited for the practice of my invention. Commonly, I apply a plurality of coatings of urethane resin to a granular fertilizer, each in the amount of about 0.25 to 3 percent (on the same basis) and repeat these applications until the total coating weight is sufficient to provide a desired rate of release of the water-soluble components contained in the fertilizer. Typically, the total weight of these coatings will be from 2 to 20 percent, more usually from 3 to 15 percent, based on the weight of the uncoated fertilizer. The total coating weight is also a function of the particle size of the fertilizer to be coated, the surface area of the fertilizer particles, the smoothness of the fertilizer particles, etc.

It should be noted that each of the coatings employed by me will not always appear as a separate, discrete coating on the final product. Further, in applying these coatings, any particular coating may not, by itself, completely encapsulate the core of fertilizer material. However, the combined effect of the plurality of coatings employed by me is to completely surround or encapsulate the core of fertilizer material with a water-insoluble skin. When one realizes that I employ at least two coatings, and preferably more coatings, the degree of encapsulation and film integrity obtained by me can be appreciated. Fertilizer products prepared according to my invention are completely encapsulated or surrounded with a water-insoluble film. When the total amount of coatings is applied in the form of a plurality of thin films (this is preferable), I prefer to employ at least three and preferably five or more individual coatings.

In coating fertilizer granules, I frequently use the urethane resins in the form of a rapid drying solvent solution. Improved results are obtained if the fertilizer granules are pre-heated to, for example, 100° to 300° F. Each successive coating or layer should be dried at least to the point of incipient gelation so that it is not loosened or lifted by the subsequent wet coatings. I have found that tumbling and gently cascading the fertilizer granules together as the wet coatings are dried improves the rate of drying, improves film integrity, and assists in completely encapsulating the fertilizer. Agglomeration is also avoided and product durability is improved. Tumbling also helps spread the resin over the surface of the fertilizer granules by a rubbing or smearing action. When the final coating has been applied, the plurally coated fertilizer is then dried and cured to a tack-free state. The final product must be tack-free to avoid compaction and agglomeration problems. The net result is a dry, free-flowable fertilizer product comprising a core of fertilizer material surrounded by a plurality of cured coatings. These coatings provide a water-insoluble shell or shield around the fertilizer and allow for the gradual release of water-soluble plant nutrients, apparently as a result of osmotic action.

While this invention has been described with reference to a particular coating material, it is to be understood that I contemplate that the coating materials of this invention could be used in conjunction with other coating materials. Thus, where granules having a highly irregular surface are to be coated, I would suggest that this surface be treated in some fashion (e.g., as by pre-coating the granules) to thereby form smoother granules. In this manner, it is possible to reduce the amount of the urethane coating material which is required to obtain the desired degree of encapsulation, film integrity, and the desired rate of release. Similarly, over-coatings can be utilized to provide better eye appeal, and the like. In any event, it is to be understood that my invention involves providing a granular fertilizer with a plurality of coatings of the particular coating material herein described.

The present invention will be further understood by reference to the following specific examples which include a preferred embodiment. Unless otherwise indicated, all parts and percentages are by weight.

In these examples, the equipment used for coating the fertilizer was a horizontally mounted drum about 36 inches long and 16 inches in diameter. Means were provided to allow hot air to be passed axially through the drum. The air flow rate could be varied from about 100–500 c.f.m. Typically, the air flow rate was about 200–350 c.f.m. An open gas flame was used to pre-heat the air. Although the temperature of the air could be as high as 300° F. or higher, it was usually kept within the range of 140°–250° F. During coating operations, the drum was rotated at a peripheral speed which could be varied from 50 inches per minute to 500 inches per minute. Typically, the speed was about 130–140 inches per minute. Baffles located within the drum were used to reduce the tendency of the fertilizer to ball-up during the coating operation.

Leach rates were determined in the following manner: a twenty (20) gram sample of fertilizer was placed in an 8 ounce screw-top bottle and 100 ml. of water was then added. The bottle was sealed and then shaken gently until all the fertilizer granules were wet. The jar was then allowed to stand at room temperature (e.g. 70°–75° F.) for a pre-selected period of time (e.g. 24 hours). At the end of this time, the contents of the bottle were again shaken to obtain a uniform solution. The solution was then passed through filter paper to remove undissolved particles, etc. A 5 ml. portion of the filtrate was then dried. The weight of the dry residue (if any) in grams, multiplied by 100 gave the percent of material leached from the fertilizer (based on the total weight of the coated fertilizer before leaching). A temperature of about 200° F. was used for drying the filtrate.

EXAMPLES OF THE COATED FERTILIZER

Example I

A granular, high analysis fertilizer (16–8–8) was plurally coated with 5% of urethane resin in the following manner:

The uncoated fertilizer was placed in the rotating drum and pre-heated to about 220°–245° F. Then each coating or layer was applied by introducing the necessary amount of resin through a long piece of aluminum tubing and spraying the hot, tumbling granules with a thin stream of resin. Simultaneously, hot air was passed through the drum. The fertilizer was pre-coated with one 3% coating of a synthetic drying oil (Admerol 351, a dicyclopentadiene copolymer). After drying for a few minutes, the coated fertilizer was dusted with ½% clay and then 5 coatings of urethane varnish were applied (1% each). A twenty-thirty minute interval was allowed between each application of urethane varnish to thereby ensure that the previous coating (in each instance) had dried at least to the point of incipient gelation. After the last coating of urethane varnish had been applied, the heat was removed and the hot, coated prills were allowed to tumble (with the air still coming through the drum) until the coated fertilizer prills were tack-free. During this final drying period, the coated granules were again dusted with ½% clay. Then, the coated fertilizer was removed from the drum and cooled. The 24-hour leach was 33.4%.

The urethane varnish used in this example was a 50% N.V. solution of urethane resin in xylene and Cellosolve acetate. The urethane resin was the reaction product of polypropylene glycol (1000 molecular weight), 1,3-butylene glycol, trimethylol propane and toluene diisocyanate. Before reaction, the NCO/OH ratio was about 1.6:1. A small amount (1%) of catalyst (triethylene diamine; DABCO) was used.

Example II

The procedure of Example I was repeated. A total of 9% of the synthetic drying oil was applied as follows: first, a 3% primer coat and then four coatings of 1½% each. Finally, two coatings of the urethane varnish were applied (1½% each). No clay was used in this example. The final product had a 72-hour leach of 8.8%.

Example III

The procedure of Example I is repeated without precoating the fertilizer and without the use of clay. The urethane coating composition employed is a 50% N.V. solution of a commercially available urethane resin (Arothane 156). The solvent is a mixture of xylol and Cellosolve acetate. A catalyst (triethylene diamine; DABCO) is used. A total coating weight of 12% is applied as follows: a first coating of 3% followed by nine coatings of 1% each. The resulting product is useful as a slow release fertilizer.

Having described the present invention with a certain degree of particularity, it will be realized that numerous minor changes and variations, falling within the spirit and scope of this invention, will become obvious to those skilled in the art. It is not intended that this invention be limited to any of the coating materials which have been mentioned as specific examples nor by any of the specific proportions which have been given for the sake of illustration, but it is intended to claim all novelty inherent to the invention, as well as all obvious modifications and variations thereof.

What is claimed is:
1. A coated fertilizer comprising:
   (a) a core of granular fertilizer containing at least one water-soluble plant nutrient;
   (b) a plurality of cured coatings of urethane resin surrounding said core; and
   (c) the total weight of coatings being from 2 to 20% based on the weight of the core.
2. The product of claim 1 wherein:
   (a) each of said cured coatings amounts to from 0.2 to 4% based on the weight of said core.
3. The product of claim 2 wherein said urethane resin is a polyether urethane.
4. The product of claim 3 wherein at least three of said coatings are present.
5. The product of claim 3 wherein said core is granular, high analysis, inorganic fertilizer containing at least one water-soluble plant nutrient compound of nitrogen, phosphorus, or potassium.
6. The product of claim 3 wherein said core is urea.
7. The product of claim 3 wherein said urethane resin is the reaction product of at least one aromatic diisocyanate, at least one polyalkylene glycol, and at least one $C_2$–$C_{12}$ aliphatic glycol or polyol.
8. The product of claim 7:
   (a) wherein said diisocyanate comprises toluene diisocyanate;
   (b) wherein said polyalkylene glycol comprises polyalkylene glycol having a molecular weight of 800–1500 and selected from the group consisting of polyethylene glycol and polypropylene glycol; and
   (c) wherein the NCO/OH ratio of the reactants is from 1.4:1 to 2:1.

References Cited by the Examiner

UNITED STATES PATENTS

| | | | |
|---|---|---|---|
| 1,648,861 | 11/1927 | O'Barr | 23—103 |
| 2,155,499 | 4/1939 | Lawson | 117—100 |
| 2,399,387 | 5/1946 | Cordie | 71—64 |
| 2,502,996 | 4/1950 | Rohner | 71—64 |
| 3,014,783 | 12/1961 | Young | 71—64 |
| 3,158,462 | 11/1964 | Wilson | 71—64 |

DONALL H. SYLVESTER, *Primary Examiner.*

THOMAS KILEY, *Assistant Examiner.*